Patented Feb. 9, 1943

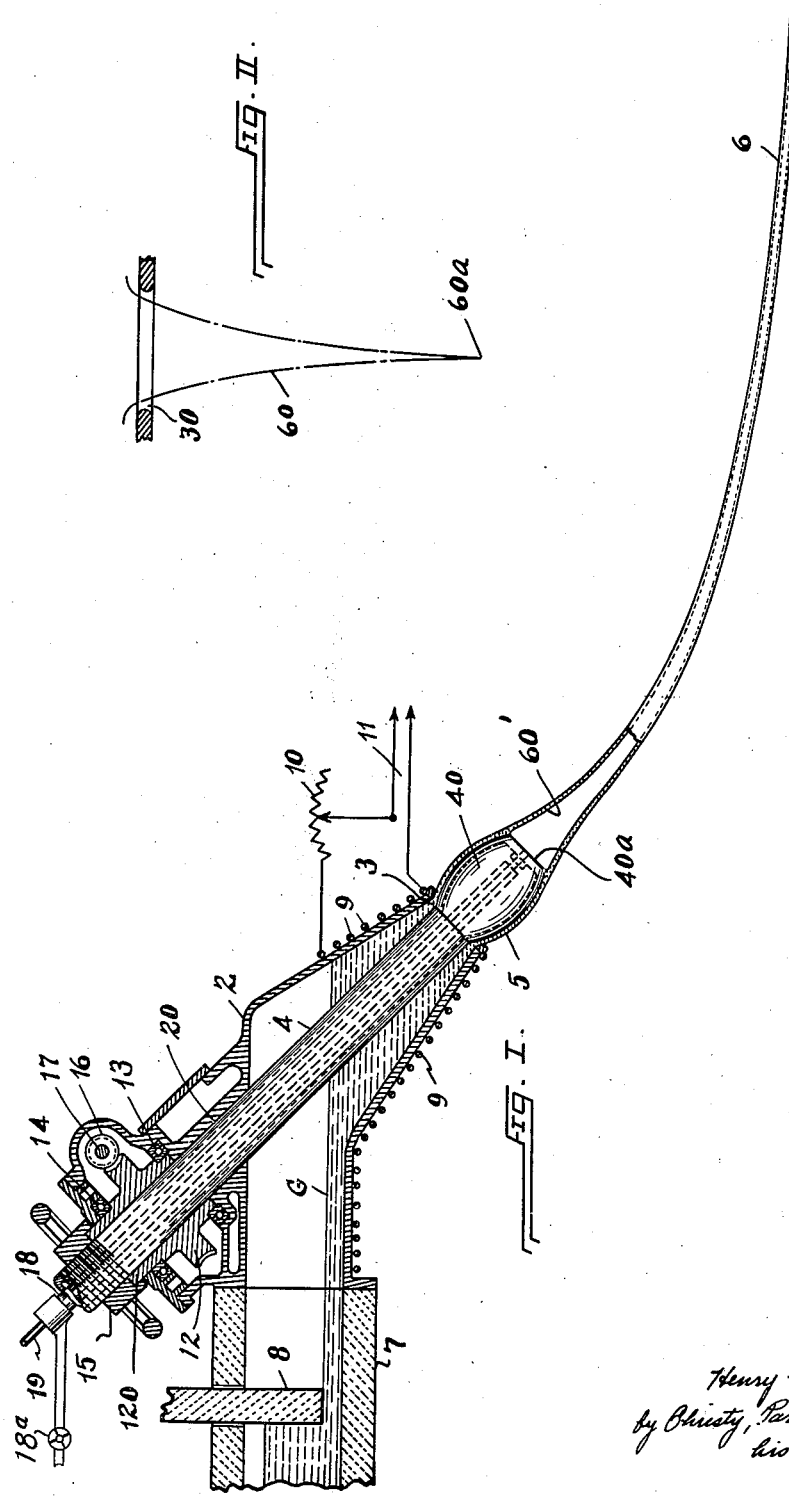

2,310,474

UNITED STATES PATENT OFFICE 2,310,474

MANUFACTURE OF GLASS TUBING

Henry F. Teichmann, Washington, Pa., assignor to Forter-Teichmann Company, a corporation of Pennsylvania Application August 10, 1940, Serial No. 352,093

1 Claim. (Cl. 49—83.1)

My invention relates to the manufacture of glass tubing, and consists in improvements in method, by virtue of which the tubing may be made faster, more economically, and superior in quality.

An exemplary apparatus, in which the method of the invention may be practiced, is illustrated in the accompanying drawing:

Fig. I is a view of the apparatus, partly in vertical section and partly in side elevation. The forehearth or drawhearth of a glass furnace or tank with which the apparatus is organized is shown fragmentarily;

Fig. II is a diagrammatic view, illustrative of the shape naturally taken by a tubular stream of molten glass flowing downward from a glass-delivering orifice.

The apparatus includes a container or nozzle 2 for a supply G of molten glass, and the container is provided with an outlet in the form of a circular orifice 3, through which a hollow mandrel 4 extends. The container 2 is secured upon the delivery end of the forehearth or feeder 7 of a glass-producing tank, and, subject to the control of an adjustable gate 8, molten glass flows from the feeder into the container 2, replenishing the supply G as need be. In service a hollow column 5 of molten glass is delivered through the orifice 3 to the surface of the mandrel portion 40 that extends outward and downward from such orifice. The hollow column of glass consists, indeed, in a continuous, thin-walled, tubular stream of molten glass that encompasses the mandrel portion 40, and flows outward over the surface thereof. Upon reaching the outer or lower end of such mandrel portion, the tubular stream of glass is drawn into glass tubing 6.

Considering the structure in more minute detail, the glass-confining walls of container 2 are advantageously constructed of a material of high heat conductivity, typically of a steel that is adapted to withstand high temperatures. Indeed, in this case all of the walls of the container are constructed of such steel. Means are provided for heating, in regulated degree, the glass-confining walls of the nozzle 2, and electrical resistors 9 arranged on the wall, as shown, are effective for the purpose. A rheostat 10, included in the energizing circuit 11 of the resistors, affords simple and effective means for regulating the heat applied to the heat-conducting walls of the nozzle, with the effect that the body G of glass within the nozzle may be maintained at precisely the optimum temperature for the tube-forming operation.

The mandrel 4 is a hollow mandrel, rotatably borne at its upper end in a bearing structure carried by, or embodied in, the upper wall of the nozzle or container 2. More particularly, the mandrel is journaled in a bearing portion 20 that is integral with the wall or body of the nozzle, and above such bearing portion the mandrel extends through, and is feathered to, a worm-gear 12. The worm-gear is axially confined between two races of anti-friction bearings 13, 14. The upper end of the mandrel is externally threaded, and is engaged by a nut 15 that abuts upon an upwardly extending hub 120 on the worm-gear. A worm 16, secured on a shaft 17 that is driven by means of a suitable motor (not shown), rotates the gear 12 at suitable speed, and the mandrel 4, being slidably splined to the gear, rotates in unison therewith. The nut 15, abutting upon and rotating as one with the gear 12, prevents the mandrel from sliding downward in its bearing. The position of the nut 15 on the threaded portion of the mandrel determines the axial position of the mandrel, and, manifestly, by rotating the nut relatively to the mandrel, either in one direction or the other, the mandrel may be adjusted in its otherwise fixed axial position.

Whereas the container 2 may be constructed in various forms, with its outlet 3 in a horizontal plane, it may (as here shown) be constructed as a downwardly tapered nozzle, with its outlet in a plane inclined to the horizontal. While this particular inclined organization is preferred, the alternate arrangement may be used. The mandrel 4 is centered on the axis of the outlet.

The mandrel is, as has been said, a hollow mandrel that extends through and outward from the outlet orifice 3. The portion 40 of the mandrel, in its extent immediately from within the orifice 3 outward, increases in girth and then decreases, forming a hollow bulb-shaped nose at the lower end of the mandrel. At the region of maximum girth, the diameter of the mandrel portion 40, preferably, if not essentially, exceeds the diameter of the orifice 3. The wall of the mandrel portion 40 is formed of a heat-conducting material, such as steel; in fact, the entire mandrel may be formed of such material. The particular form of the mandrel portion 40 is valuable for several reasons, one of which may be mentioned now; to wit, by virtue of its particular shape the mandrel portion 40 may be used as a stopper in the orifice 3, when the apparatus is not in use, it being necessary merely to turn the nut 15 and draw the mandrel upward until the portion 40 closes the orifice. It may be noted additionally that when the apparatus is in operation the position of such mandrel portion may be varied relatively to the orifice, to establish and maintain the flow of glass at precisely the most effective rate.

Means are provided for maintaining a circulating stream of cooling water upon the internal surface of the nose portion 40 of the mandrel, and such means include a duct 18 that extends on the mandrel axis downward into the mandrel, and terminates adjacent to the wall 40a at the tip of the mandrel nose portion. The duct 18 is at its upper end connected to a water supply line including a conventional control valve 18a. The water delivered by duct 18 sweeps over the inner surfaces of the mandrel portion 40, whence it flows upward between the walls of the duct 18 and the mandrel body 4 to an outlet line (not shown), leading from the upper end of the mandrel. Thus, a circulation of cooling water is maintained within the mandrel, with the effect that heat is drawn through the wall of the mandrel portion 40 from the molten glass 5 flowing thereupon. It will be perceived that the mandrel portion 40 extends from the orifice 3 into the open atmosphere, whereby the internally cooled stream of glass 5 is subject to the cooling effect of air on its external surface.

It is important to note that, by controlling the rate at which cooling water is delivered into the mandrel, the quantity of heat removed from the inner surface of the tubular stream of glass is regulated or proportioned relatively to the heat removed from the outer surface thereof. This internal and external cooling of the glass on the mandrel has a great deal to do with the good results and advantages obtained: In the production of the tubing 6, the glass may be drawn at higher speed from the mandrel; the glass may be drawn immediately from the mandrel into the ultimate product, without contacting drawing or cooling dies, or other instrumentalities that tend to produce defects in the surface of the glass tubing. And the proportioning of the hydraulic cooling effect upon the internal surface of the tube 5 to the pneumatic cooling effect upon the external surface of such tube affords a nicety of control of the glass-cooling gradient, and provides precise control of the setting or freezing of the glass that forms skin upon the inner and outer surfaces of the hot plastic wall of the tube. Advantageously, the formation of skin is, by the, establishing of a particular ratio between the rates of internal and external cooling, caused to take place simultaneously, or substantially so, depending upon the particular size of tubing being formed and the speed of drawing. These are factors, I have found, of great value in the manufacture of glass tubing.

An additional feature to be noted is that the tubular stream 5 of glass, in the course of its flow over the heat-absorbing surface of the mandrel portion 40 is radially expanded and then contracted, producing a beneficial "working" of the glass immediately before it leaves the mandrel. The effect is obtained by forming the mandrel portion 40 with varied diameter—with a girth that successively increases and decreases in the extent of the mandrel outward from the orifice 3, as already described. This "working" of the glass eliminates "checking" and striations on the surface of the tubing, and eliminates bubbles within the body of the tubing wall.

It has been found that a tubular stream of molten glass, flowing freely downward from an orifice, tends naturally to contract, the contraction being progressive with the distance from the orifice, until at a certain interval below the orifice the walls of the tube close. Such phenomenon is indicated diagrammatically in Fig. II, in which the broken lines 60 represent in sectional outline the internal surface of a tubular stream of glass flowing freely from a circular orifice 30. This showing of Fig. II illustrates how a descending tube of plastic glass decreases in diameter progressively in the course of its downward movement, until, at the point 60a, the wall of the tube closes and forms the stream of glass into a solid column. The internal surface of the hollow column of glass between orifice 30 and point 60a is conical or concavo-conical, forming what is known as the "natural concave cone" of the tubular stream of glass. In Fig. II the lines 60 indicate in outline the "natural concave cone" of glass flowing from orifice 30 under given temperature conditions and rate of delivery to the orifice. With this explanation in mind, it is to be understood that I form the external surface of mandrel portion 40 to substantial conformity with the "natural cone" of the tubular stream of plastic glass flowing from the mandrel portion 40. More specifically, the body of the mandrel portion 40 is in form an ellipsoid, a body that first increases in girth in its extent from the orifice 3 outward, and then progressively decreases, in such manner as to provide a surface that substantially conforms to the concave cone (60', Fig. I) of the tube of glass moving from the mandrel. I have found that in consequence the glass may be drawn from the mandrel at higher speed than heretofore, with the rate of production of tubing increased accordingly.

In the usual tube-forming machines of the art, air is introduced to the tubular stream of glass leaving the mandrel, to prevent the wall of the tube from collapsing and closing. Indeed, by regulating the pressure of the air thus introduced, the progressive contraction of the tube is arrested at the point at which the tube reaches the diameter desired in the finished article, and, while the wall of the tube drawn in continuous course away from the mandrel is thus held to desired diameter, the glass is allowed to solidify. In accordance with such practice, I provide a pipe 19 for introducing air through the tip of the mandrel nose 40 to the tubular stream of glass being drawn, and, by regulating the pressure of such air, I inhibit collapse of the tube, while allowing the tube to contract in diameter to the value desired in the ultimate tubing 6. The air line 19 extends through the water duct 18, but is hydraulically sealed therefrom, and opens at its lower end through the end wall 40a of the mandrel.

The means for drawing the tubing 6 from the mandrel are not illustrated herein, inasmuch as the art is now familiar with mechanisms that may be used for the purpose. Suffice it to say that the tubing, drawn from the mandrel to desired diameter, is allowed to solidify, and is otherwise treated, in accordance with known practice.

In the operation of the apparatus herein illustrated and described, the method of the invention is realized, comprising the following steps:

1. The molten glass is delivered from a nozzle-like container to the mandrel portion 40 in the form of a completely formed, thin-walled hollow column (5).

2. The thickness of the wall of the glass column is regulated by adjusting the position of mandrel portion 40 relatively to orifice 3.

3. Heat is removed from both the inner and outer surfaces of the tubular body of glass flowing over the mandrel, the removal of heat from the outer surface of such tube of glass being effected by the atmosphere into which the tubing is drawn, and the removal of heat from the inner surface being effected by a regulated circulation of cooling liquid within the mandrel.

4. The tubular body of glass is radially expanded and contracted as it is drawn over and from the end of the mandrel.

5. The glass, flowing upon the portion of the mandrel that extends outward from the region of maximum girth, is caused to conform to the "natural concave cone" of the tubular stream of glass drawn from the mandrel.

6. The mandrel is rotated.

7. Heat is supplied through the wall of the container 2 to the molten glass, and the quantity of heat so supplied is regulated relatively to the heat removed from the glass by the liquid cooled mandrel, whereby in the course of the operation skin is formed progressively on the inner and outer surfaces of the plastic tube, with subsequent solidification of the body of the tube between such surfaces.

Various modifications may be made in the apparatus employed in performing the method steps of the invention defined in the appended claim.

I claim as my invention:

The method herein described of producing glass tubing that comprises delivering molten glass from the refining chamber of a glass furnace to the interior of a nozzle, drawing a tube of plastic glass from the nozzle and over a mandrel that extends through the orifice of the nozzle into a cooling atmosphere, the mandrel terminating adjacent said orifice and exterior thereof, the exterior end of the mandrel being enlarged relative to the remainder of the mandrel, whereby expansion and contraction of the tube as it is drawn over and from the end of the mandrel take place, circulating cooling liquid in regulated quantity within the mandrel to abstract heat from the internal surface of the tube, supplying heat to the molten glass within the nozzle and regulating the quantity of heat supplied relatively to the heat removed from the glass by the mandrel, whereby in the course of the operation skin is formed progressively on the inner and outer surfaces of the plastic tube, with subsequent solidification of the body of the tube between such surfaces.

HENRY F. TEICHMANN.